United States Patent
Rossmann (10) Patent No.: US 11,565,474 B2
(45) Date of Patent: Jan. 31, 2023

(54) SYSTEM AND METHOD FOR BUILD ERROR DETECTION IN AN ADDITIVE MANUFACTURING ENVIRONMENT

(71) Applicant: MATERIALISE N.V., Leuven (BE)

(72) Inventor: Christian Rossmann, Leuven (BE)

(73) Assignee: Materialise NV, Leuven (BE)

(*) Notice: Subject to any disclaimer, the term of this patent is extended or adjusted under 35 U.S.C. 154(b) by 234 days.

(21) Appl. No.: 16/757,107

(22) PCT Filed: Nov. 7, 2018

(86) PCT No.: PCT/US2018/059629
§ 371 (c)(1),
(2) Date: Apr. 17, 2020

(87) PCT Pub. No.: WO2019/094472
PCT Pub. Date: May 16, 2019

(65) Prior Publication Data
US 2021/0370608 A1    Dec. 2, 2021

Related U.S. Application Data

(60) Provisional application No. 62/583,869, filed on Nov. 9, 2017.

(51) Int. Cl.
| B33Y 50/02 | (2015.01) |
| B29C 64/393 | (2017.01) |
| B33Y 10/00 | (2015.01) |
| B29C 64/153 | (2017.01) |
| G06F 30/23 | (2020.01) |
| G06F 119/02 | (2020.01) |
| G06F 113/10 | (2020.01) |

(52) U.S. Cl.
CPC .......... B29C 64/393 (2017.08); B29C 64/153 (2017.08); B33Y 10/00 (2014.12); B33Y 50/02 (2014.12); G06F 30/23 (2020.01); G06F 2113/10 (2020.01); G06F 2119/02 (2020.01)

(58) Field of Classification Search
CPC .................................................... B33Y 50/02
USPC .......................................................... 700/98
See application file for complete search history.

(56) References Cited

U.S. PATENT DOCUMENTS

| 2015/0165683 A1* | 6/2015 | Cheverton ............ B29C 64/124 382/141 |
| 2016/0086376 A1 | 3/2016 | Tang et al. |

(Continued)

FOREIGN PATENT DOCUMENTS

| JP | 2017077671 A | 4/2017 |
| WO | 2016133679 A1 | 8/2016 |
| WO | 2017074490 A1 | 5/2017 |

OTHER PUBLICATIONS

Peng, Hao et al., "Fast Prediction of Thermal Distortion in Metal Powder Bed Fusion Additive Manufacturing: Part 2, a Quasi-Static Thermo-mechanical Model", Additive Manufacturing, Dec. 19, 2016, pp. 869-882.

(Continued)

*Primary Examiner* — Suresh Suryawanshi
(74) *Attorney, Agent, or Firm* — Dinsmore & Shohl LLP (57) ABSTRACT

A system and method for detecting, based on a simulation of a build of an object using additive manufacturing, if the build of the object would be flawed or would fail during actual additive manufacturing of the object is provided.

17 Claims, 8 Drawing Sheets

(56) References Cited

U.S. PATENT DOCUMENTS

2017/0057170 A1* 3/2017 Gupta ................ G05B 19/4099
2017/0310935 A1* 10/2017 Sinclair ................ B29C 64/245
2017/0372480 A1* 12/2017 Anand .................... G06T 19/20

OTHER PUBLICATIONS

Peng, Hao et al., "Part-scale model for fast prediction of thermal distortion in DMLS additive manufacturing; Part 2: a quasi-static thermomechanical model" Solid Freeform Fabrication 2016: Proceedings of the 27th Annual International Solid Freeform Fabrication Symposium, An Additive Manufacturing Conference Reviewed Paper, pp. 382-397.

* cited by examiner

SYSTEM AND METHOD FOR BUILD ERROR DETECTION IN AN ADDITIVE MANUFACTURING ENVIRONMENT

CROSS-REFERENCE TO RELATED APPLICATIONS

This application claims the benefit of U.S. Provisional Patent No. 62/583,869, filed Nov. 9, 2017. The content of the provisional application is hereby incorporated by reference in its entirety.

BACKGROUND OF THE INVENTION

Field of the Invention

This application relates to additive manufacturing. More particularly, this application relates to a system and method for detecting, based on a simulation of a build of an object using additive manufacturing, if the build of the object would lead to build errors, such as build failure during actual additive manufacturing of the object.

Description of the Related Technology

In the field of additive manufacturing, three dimensional solid objects are formed from a digital model. Because the manufactured objects are three dimensional, additive manufacturing is commonly referred to as three dimensional ("3D") printing. Some techniques for additive manufacturing include selective laser sintering ("LS") manufacturing and metal sintering. These techniques direct a laser beam to a specified location in order to polymerize or solidify layers of building materials which are used to create the desired three dimensional ("3D") object. The 3D object is built on a layer-by-layer basis by solidifying the layers of the building material.

It can be difficult at the design stage to know whether a particular designed object can be successfully built (e.g., without errors, within tolerances, etc.). Accordingly, build of an object may have errors, which may even cause the build to fail during the additive manufacturing process. If build of an object fails during the additive manufacturing process, the partially-built object may need to be discarded, the object redesigned, and then the actual additive manufacturing of the object started over again. Similarly, an object that is built to completion but contains errors may be need to discarded, redesigned and rebuilt. There is potential that the build may lead to flawed parts or may fail several times during actual additive manufacturing of the object, costing time and materials.

In view of these and other problems identified by the inventor, systems and methods that improve detecting if the build of an object would lead to a build error during actual additive manufacturing of the object are described herein. It should be noted that a build error, as described herein may generally refer to an error where the object is built to completion but contains errors and/or a build failure where the object is not built to completion.

SUMMARY

In one embodiment, a computer-implemented method for determining potential build errors of an object to be built using additive manufacturing is provided. The method includes simulating, by a computing device, a build of a plurality of layers of the object, each of the plurality of layers comprising a plurality of nodes corresponding to different locations in each of the plurality of layers. The method further includes for each of one or more nodes of each of one or more of the plurality of layers, determining, by the computing device, one or more displacement vector values corresponding to a difference between a simulated position of the node based on the simulating the build and a designed position of the node based on a design of the object, wherein each of the one or more displacement vector values of the node correspond to a different number of layers having been simulated as built. The method further includes for each of one or more nodes of each of one or more of the plurality of layers, determining, by the computing device, a displacement metric based on a difference in deformation between layers metric based on a difference between displacement vector values corresponding to adjacent layers. The method further includes determining, by the computing device, there is a potential build error when any of the plurality of nodes of the plurality of layers has a displacement metric that does not satisfy a threshold. The method further includes determining, by the computing device, there is not a potential build error when each of the plurality of nodes of each the plurality of layers has a displacement metric that does satisfy the threshold.

DETAILED DESCRIPTION OF CERTAIN INVENTIVE EMBODIMENTS

Systems and methods disclosed herein include mechanisms for detecting if the build of an object would have errors leading to a build error during actual additive manufacturing of an object.

Though some embodiments described herein are described with respect to certain additive manufacturing techniques using certain building materials (e.g., metals), the described system and methods may also be used with certain other additive manufacturing techniques and/or certain other building materials as would be understood by one of skill in the art.

Additive manufacturing, such as when using metal as a building material, may pose certain challenges. For example, an object manufactured using additive manufacturing may have deformations due to residual stresses during the additive manufacturing process that may lead to microcracks or ruptures of the object or supports formed during the additive manufacturing that support the object during the additive manufacturing process. Such issues during the additive manufacturing process may cause a failure during the building of the object, or results in an object that is not suitable for its purpose. Accordingly, techniques are described herein for providing an approach (e.g., numerical approach) to detect, qualitatively, regions (e.g., high risk regions) in designs of objects to manufactured using additive manufacturing (e.g., using metal as a building material) that 1) may cause problems with the manufacturing of the object (e.g., due to deformations that impede on movement of a recoater); and/or 2) may lead to a rupture or stress-line in the object that compromise quality of the object.

The methods described herein address a technical problem of how to identify, even before manufacturing, regions on a 3D object that are likely to cause problems during the build, leading to build errors. For example, the methods provide steps to identify displacement errors in a build, such as displacement errors that may lead to stress-line formation, recoater collisions, and potentially build failures. The methods may be used iteratively to further assess risk after the 3D objects have been adjusted or changed. The present application demonstrates an advance over other approaches in the art that have focused on developing simulation methods and models (e.g., thermal and/or structural analyses simulations) and presenting results (e.g., in a color plot that illustrates predicted deformation), but do not provide further guidance on how the simulated results relate to build errors such as formation of stress-lines or build failures.

Figure 1:
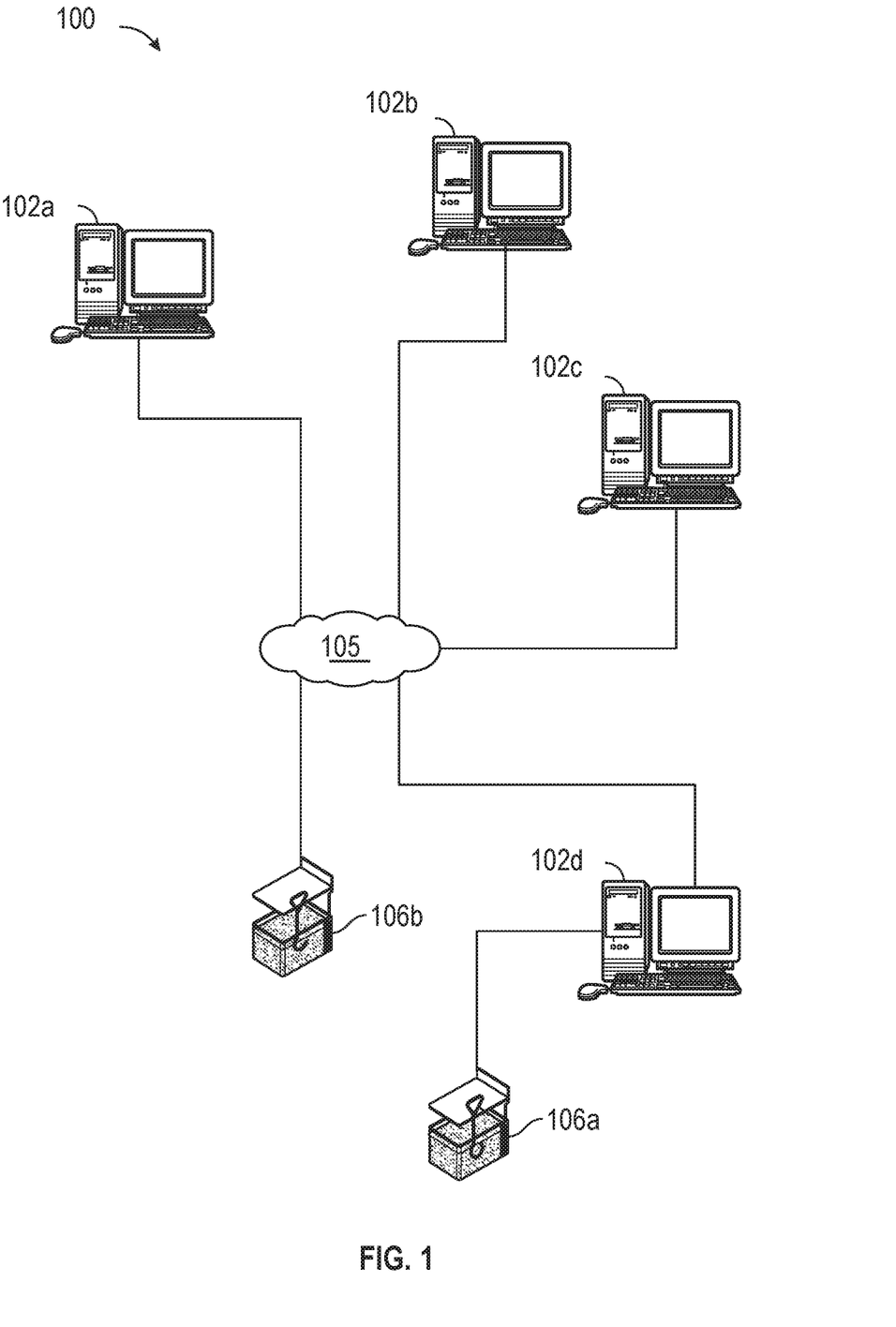
FIG. 1 is an example of a system for designing and manufacturing 3D objects.

Embodiments of the invention may be practiced within a system for designing and manufacturing 3D objects. Turning to FIG. 1, an example of a computer environment suitable for the implementation of 3D object design and manufacturing is shown. The environment includes a system 100. The system 100 includes one or more computers 102a-102d, which can be, for example, any workstation, server, or other computing device capable of processing information. In some embodiments, each of the computers 102a-102d can be connected, by any suitable communications technology (e.g., an internet protocol), to a network 105 (e.g., the Internet). Accordingly, the computers 102a-102d may transmit and receive information (e.g., software, digital representations of 3-D objects, commands or instructions to operate an additive manufacturing device, etc.) between each other via the network 105.

The system 100 further includes one or more additive manufacturing devices (e.g., 3-D printers) 106a-106b. As shown the additive manufacturing device 106a is directly connected to a computer 102d (and through computer 102d connected to computers 102a-102c via the network 105) and additive manufacturing device 106b is connected to the computers 102a-102d via the network 105. Accordingly, one of skill in the art will understand that an additive manufacturing device 106 may be directly connected to a computer 102, connected to a computer 102 via a network 105, and/or connected to a computer 102 via another computer 102 and the network 105.

It should be noted that though the system 100 is described with respect to a network and one or more computers, the techniques described herein also apply to a single computer 102, which may be directly connected to an additive manufacturing device 106.

Figure 2:
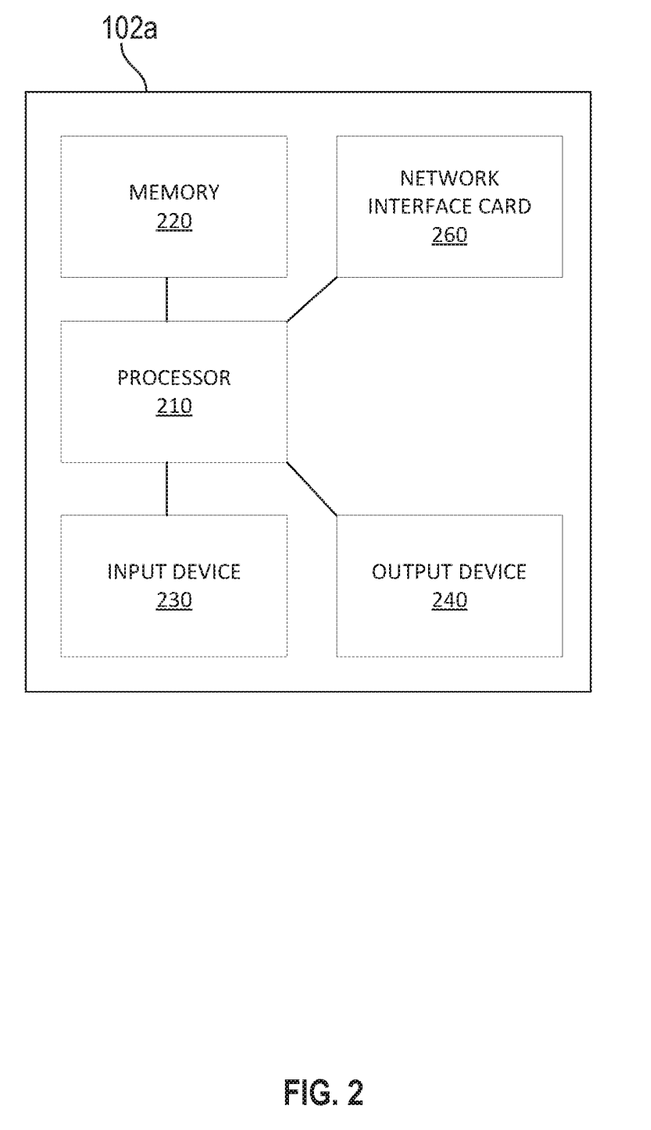
FIG. 2 illustrates a functional block diagram of one example of the computer shown in FIG. 1.

FIG. 2 illustrates a functional block diagram of one example of a computer of FIG. 1. The computer 102a includes a processor 210 in data communication with a memory 220, an input device 230, and an output device 240. In some embodiments, the processor is further in data communication with an optional network interface card 260. Although described separately, it is to be appreciated that functional blocks described with respect to the computer 102a need not be separate structural elements. For example, the processor 210 and memory 220 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 also may be coupled to an input device 230 and an output device 240 for, respectively, receiving input from and providing output to a user of the computer 102a. Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 210 further may be coupled to a network interface card 260. The network interface card 260 prepares data generated by the processor 210 for transmission via a network according to one or more data transmission protocols. The network interface card 260 also decodes data received via a network according to one or more data transmission protocols. The network interface card 260 can include a transmitter, receiver, or both. In other embodiments, the transmitter and receiver can be two separate components. The network interface card 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3:
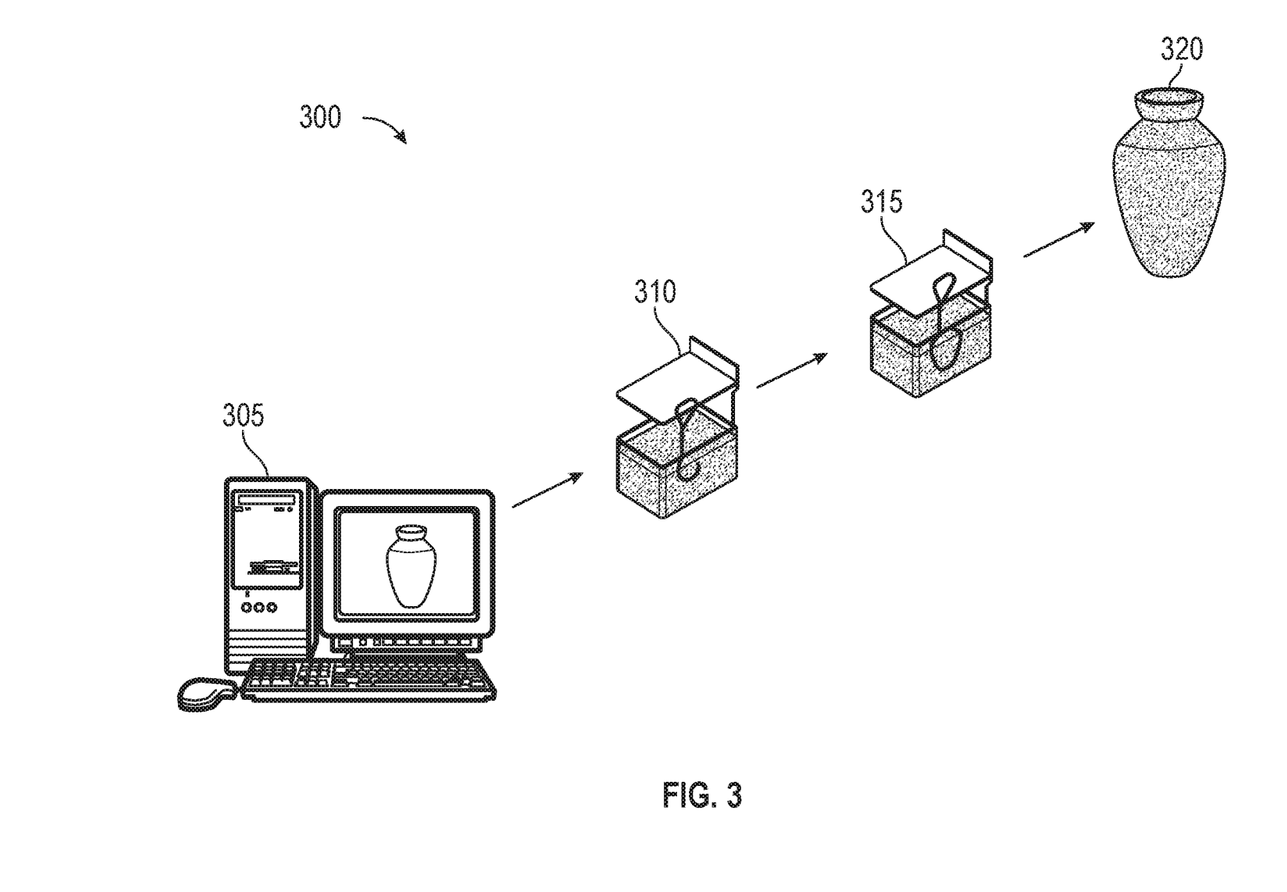
FIG. 3 shows a high level process for manufacturing a 3D object using.

FIG. 3 illustrates a process 300 for manufacturing a 3-D object or device. As shown, at a step 305, a digital representation of the object is designed using a computer, such as the computer 102a. For example, 2-D or 3-D data may be input to the computer 102a for aiding in designing the digital representation of the 3-D object. Continuing at a step 310, information is sent from the computer 102a to an additive manufacturing device, such as additive manufacturing device 106, and the device 106 commences the manufacturing process in accordance with the received information. At a step 315, the additive manufacturing device 106 continues manufacturing the 3-D object using suitable materials, such as a polymer or metal powder. Further, at a step 320, the 3-D object is generated.

Figure 4A:
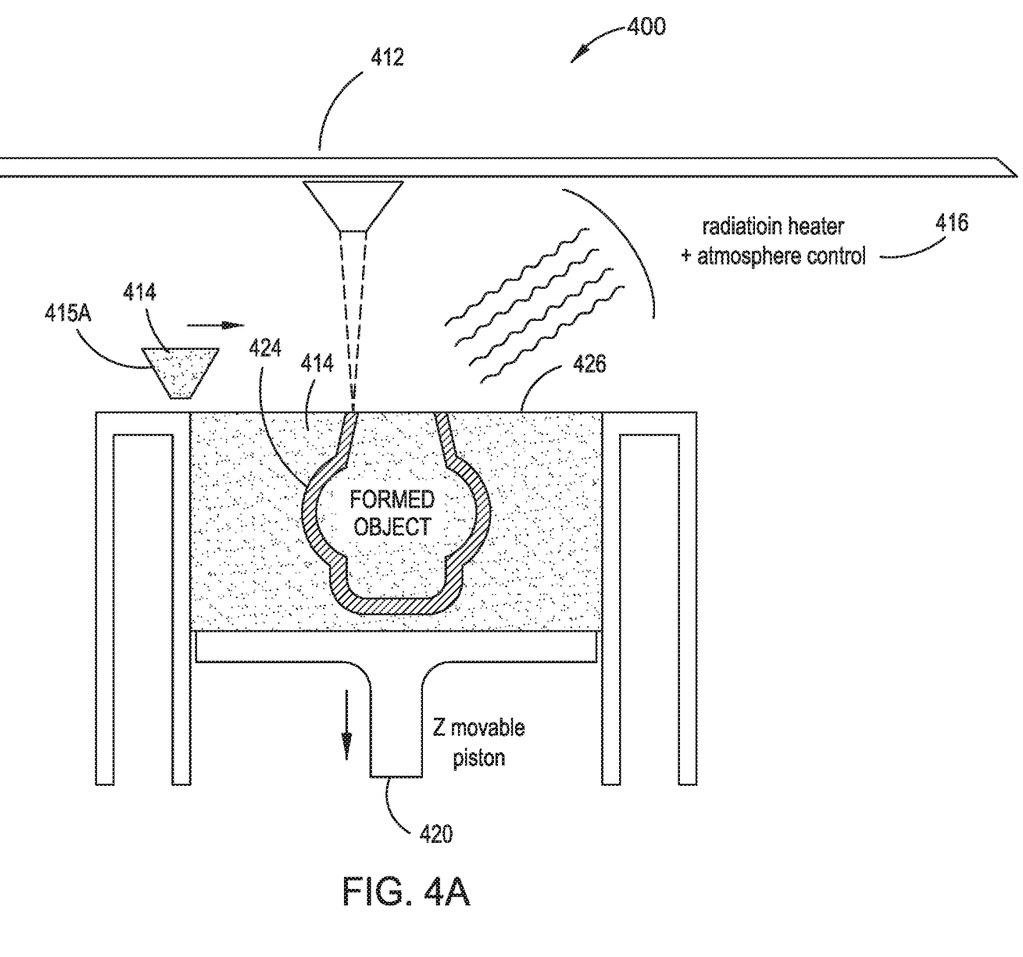
FIG. 4A is an example of an additive manufacturing apparatus with a recoating mechanism.

FIG. 4A illustrates an exemplary additive manufacturing apparatus 400 for generating a three-dimensional (3-D) object. In this example, the additive manufacturing apparatus 400 is a laser sintering device. The laser sintering device 400 may be used to generate one or more 3D objects layer by layer. The laser sintering device 400, for example, may utilize a powder (e.g., metal, polymer, etc.), such as the powder 414, to build an object a layer at a time as part of a build process.

Successive powder layers are spread on top of each other using, for example, a recoating mechanism 415A (e.g., a recoater blade). The recoating mechanism 415A deposits powder for a layer as it moves across the build area, for example in the direction shown, or in the opposite direction if the recoating mechanism 415A is starting from the other side of the build area, such as for another layer of the build. After deposition, a computer-controlled CO2 laser beam scans the surface and selectively binds together the powder particles of the corresponding cross section of the product. In some embodiments, the laser scanning device 412 is an X-Y moveable infrared laser source. As such, the laser source can be moved along an X axis and along a Y axis in order to direct its beam to a specific location of the top most layer of powder. Alternatively, in some embodiments, the laser scanning device 412 may comprise a laser scanner which receives a laser beam from a stationary laser source, and deflects it over moveable mirrors to direct the beam to a specified location in the working area of the device. During laser exposure, the powder temperature rises above the material (e.g., glass, polymer, metal) transition point after which adjacent particles flow together to create the 3D object. The device 400 may also optionally include a radiation heater (e.g., an infrared lamp) and/or atmosphere control device 416. The radiation heater may be used to preheat the powder between the recoating of a new powder layer and the scanning of that layer. In some embodiments, the radiation heater may be omitted. The atmosphere control device may be used throughout the process to avoid undesired scenarios such as, for example, powder oxidation.

Figure 4B:
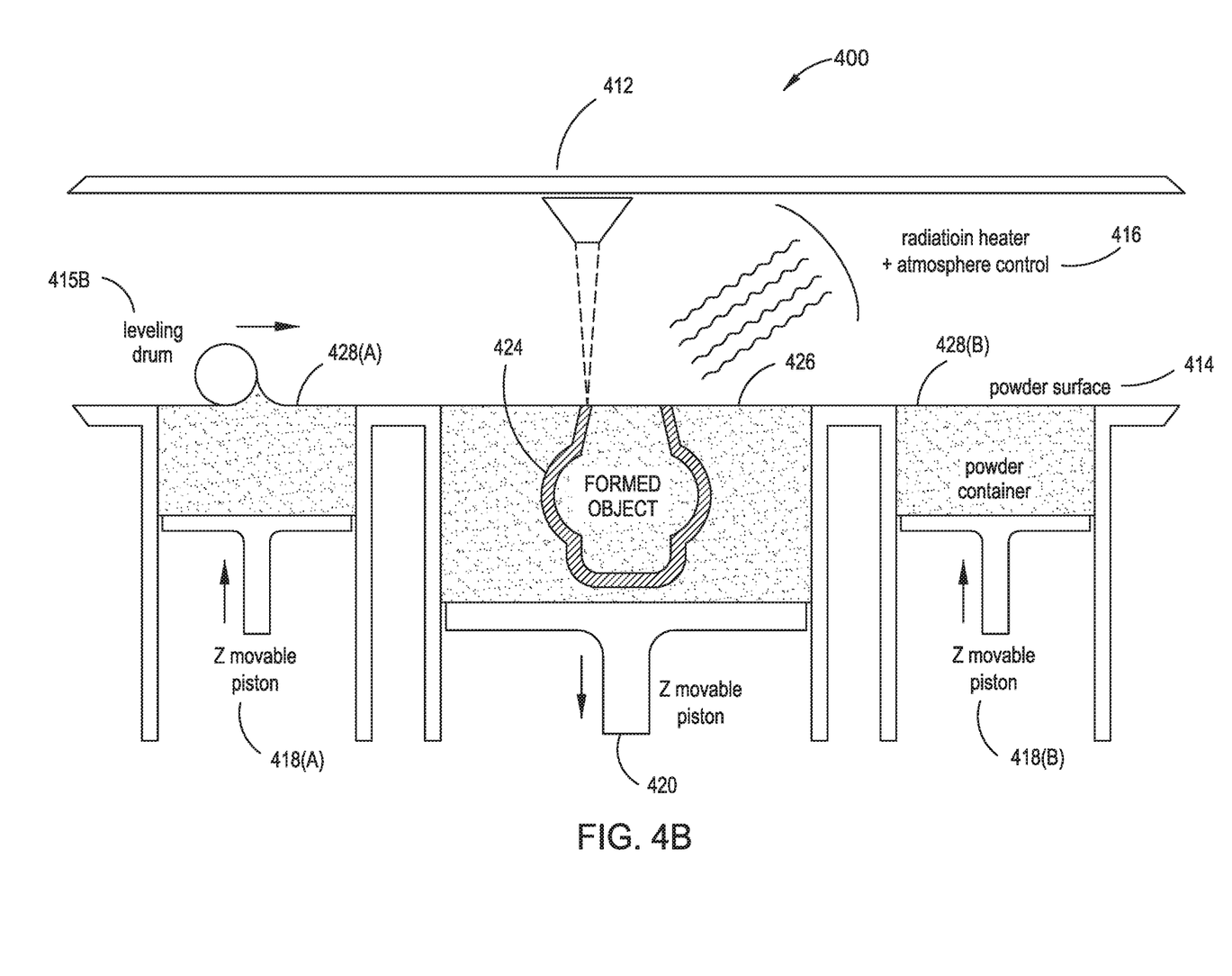
FIG. 4B is another example of an additive manufacturing apparatus with a recoating mechanism.

In some other embodiments, such as shown with respect to FIG. 4B, a recoating mechanism 415B (e.g., a leveling drum/roller) may be used instead of the recoating mechanism 415A. Accordingly, the powder may be distributed using one or more moveable pistons 418(a) and 418(b) which push powder from a powder container 428(a) and 428(b) into a reservoir 426 which holds the formed object 424. The depth of the reservoir, in turn, is also controlled by a moveable piston 420, which increases the depth of the reservoir 426 via downward movement as additional powder is moved from the powder containers 428(a) and 428(b) in to the reservoir 426. The recoating mechanism 415B, pushes or rolls the powder from the powder container 428(a) and 428(b) into the reservoir 426. Similar to the embodiment shown in FIG. 4A, the embodiment in FIG. 4B may use the radiation heater alone for preheating the powder between recoating and scanning of a layer.

Eventually, when all layers in the part are scanned, the 3D object is complete. Unfortunately, build errors may arise at a variety of different steps in the manufacturing process. A build error (also "error" or "error during build") may include displacement errors in which one or more layers of an object are displaced in space relative to the digital representation of the 3-D object and/or relative to other layers in the object. In some embodiments, mechanical and/or thermal stresses may cause displacement errors. Displacement errors may occur in either the object being built or in support structures. Displacement errors which arise during manufacturing may lead to deformation such as a warpage, curling, or dross; formation of cracks, micro-cracks, ruptures, surface errors, or stress-lines (may also be called shrinklines, layer shifts, or printing shifts) in which one layer of a part is displaced relative to its neighboring layer(s); and/or recoater collisions in which a projecting portion of a part may contact or collide with a recoater in an additive manufacturing apparatus. A recoater collision may, in turn, disrupt powder deposition for all or a part of the layer, or may cause displacement of subsequent layers, eventually resulting in a partial or complete build failure. A build failure may refer to an incomplete manufacturing process in which an object is not built at all or is not built to completion.

Build errors may result in a build failure, or, alternatively, may result in a flawed manufacturing process in which an object is built to completion but does not meet quality standards. For example, build errors comprising displacement errors (also "displacement") in the object may result in a deformed, poor object quality comprising by surface abnormalities and/or structural weaknesses. Build errors such as stress-lines may be associated with structural defects. Poor quality objects with such errors may have to be scrapped and re-built.

Because build errors may disrupt or delay the manufacturing process, additional time and materials are often required for investigating a root cause (or root causes) of errors, solving the errors where possible, re-building the objects and inspecting the quality of the built objects. Where build errors can be detected before an object is built, for example, by detecting likely errors during build preparation and performing corrective actions, then significant time and costs may be saved.

Figure 5:
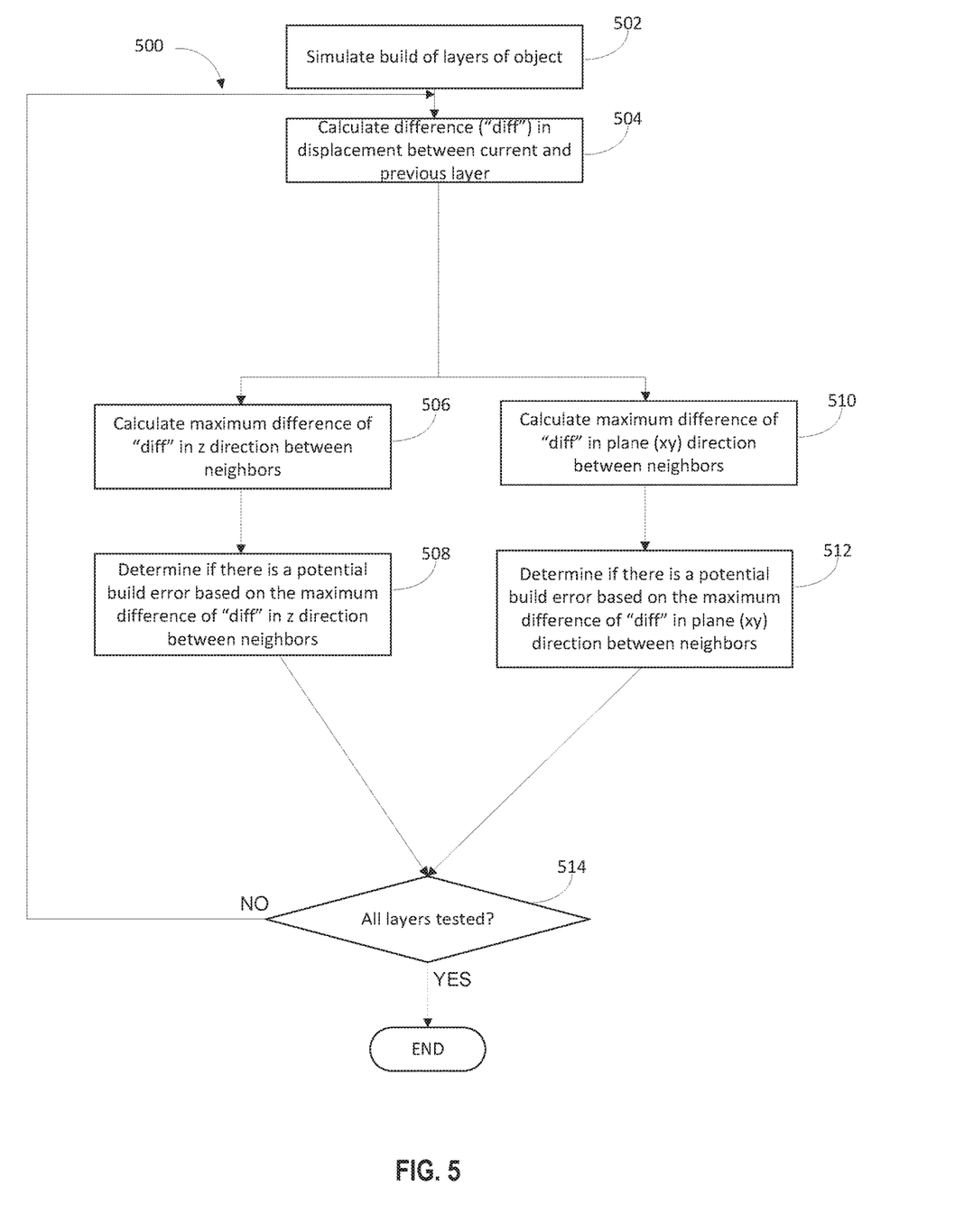
FIG. 5 is a flowchart of an example process for detecting potential build errors of an object to be manufactured using additive manufacturing.

FIG. 5 is a flowchart of an example process 500 for detecting potential build error of an object to be manufactured using additive manufacturing. The process 500 may be performed by a suitable computing device, such as a computer 102. In certain embodiments, process 500 includes using numerical (e.g., finite element method (FEM)) simulation of building an object on a layer by layer basis to determine potential layer-based deformations of the object that would occur when actually manufacturing the object using additive manufacturing techniques.

At 502, the building of layers (e.g., all layers, every other layer, etc.) of the object is simulated, such as using a numerical simulation (e.g., FEM). For example, a digital model/representation of the object (e.g., CAD file, STL file, etc.) is input into a simulation program (e.g., a known simulation program that uses FEM, such as Simufact, Abaqus, Amphyon, etc.). The simulation program outputs a simulation of the layers including parameters (e.g., amount of shrinkage, displacement, stresses, strains, stiffness, material properties, etc.) for different nodes or regions (e.g., at different X-Y coordinates of an X-Y plane corresponding to a layer) of each layer of the object.

For example, the simulation program may output a displacement vector U, for each node indicating the displacement of that node in space between where the node is supposed to be in the object (e.g., relative to a build platform of the additive manufacturing device) when manufactured (e.g., the design location) and where the node is simulated to be when manufactured (e.g., the simulation location). The displacement vector $U_{xyz}$ may include a z component (e.g., a component perpendicular to a build platform and parallel with the direction of subsequent layers) and x and y components (e.g., components in a plane parallel to a build platform, in particular the plane of the layer itself). The displacement may mean that portions of the object may not be located in the correct location on the object, leading to deformations.

Displacement may be measured as a difference in simulation location of a node as compared to the design location of the corresponding node. In general, the simulation location of the node may be compared to a reference location that is remains unchanged. The reference location may be the location of the corresponding node, or may be a general reference location.

Displacement errors occurring between as few as two layers in the object may lead to build errors. For example, displacement of a node in the xy-direction (e.g., in an xy-plane) in a first layer may already be sufficient to cause a stress-line to form between the first layer and an adjacent layer above and below the plane of the first layer. In some embodiments, displacement in the xy-direction may occur in a plurality of nodes across a plurality of layers, so that the stress-line results from xy displacement of a plurality of nodes across the plurality of layers. Displacement of a node in the z-direction (e.g., in a z-plane) may already be sufficient to cause a recoater collision and/or a build failure. In some embodiments, displacement in the z-direction may occur in a plurality of nodes across a plurality of layers before the recoater collision and/or build failure occurs. When a displacement error in the z-direction is greater than the thickness of powder layer, then the displacement error may lead to a recoater collision.

In particular, the simulation program may output a displacement vector $U_{xyz\_n}$ over time for each node, where the displacement is measured as the build of each layer n (where n=1 is the first layer simulated, n=2 is the second layer simulated, etc.) of the object is simulated. For example, when build of the first layer (e.g., n=1) is simulated, a displacement vector $U_{xyz\_1}$ may be calculated and output for each node in the first layer. When the build of the second layer (e.g., n=2) is simulated, the displacement of one or more of the nodes in the first layer may change due to the build of the second layer. Accordingly, an updated displacement vector $U_{xyz\_2}$ may be calculated and output for each node in the first layer in addition to each node in the second layer. Accordingly, for nodes of a given layer n, displacement vectors are calculated and output for each of the layer n up to a last layer m of the object.

At 504, for a next given layer in order (e.g., starting at the second layer of the build, n=2), for each node in the given layer, a difference (e.g., absolute difference, magnitude of the difference, etc.) displacement vector $dU_{xyz\_n}$ is calculated that is the difference in displacement for the current layer, $U_{xyz\_n}$ minus the displacement for the previous layer $U_{xyz\_n-1}$ (e.g., $dU_{xyz\_n}=U_{xyz\_n}-U_{xyz\_n-1}$). The difference displacement vector $dU_{xyz\_n}$ may include a z component $dU_{z\_n}$ (e.g., a magnitude of a component of the difference that is perpendicular to a build platform and parallel with the direction of subsequent layers) and an x-y component $dU_{xy\_n}$ (e.g., a magnitude of a component of the difference that is in a plane parallel to a build platform, in particular the plane of the layer itself).

At 506, for the given layer, for each node in the given layer, the maximum absolute difference $dU_{z\_n\_mx}$ between $dU_{z\_n}$ for the node and for any neighboring nodes (e.g., other nodes in the given layer within a threshold distance (e.g., within 10 adjacent nodes) of the node) is calculated. For example, if a node has a $dU_{z\_n}=2$, and neighboring nodes have values of 4, 7, 9, 2, 5, then $dU_{z\_n\_mx}=abs(2-max(4, 7, 9, 2, 5))=7$. In certain embodiments, the $dU_{z\_n\_mx}$ values may be normalized (e.g., scaled to a range from 0-1).

At 508, for the given layer, for each node it is determined if $dU_{z\_n\_mx}$ satisfies (e.g., is below) a threshold value. If the $dU_{z\_n\_mx}$ does not satisfy (e.g., is above) the threshold value, it is determined that there is a potential build error at the node, such as due to a deformation that may impact or impede movement of a recoater. If the $dU_{x\_n\_mx}$ does satisfy (e.g., is below) the threshold value, it is determined that there is no potential build error at the node, such as due to a deformation that may impact or impede movement of a recoater. In particular, the $dU_{z\_n\_mx}$ value may indicate the difference in amount of displacement in the z direction of the node as compared to neighboring nodes. If a node is displaced much more than its neighboring nodes, this may be indicative of a potential error. An exemplary threshold value for determining risk of a recoater collision is a value that is approximately the thickness of a layer of powder in the build.

At 510, for the given layer, for each node in the given layer, the maximum absolute difference $dU_{x\_n\_mx}$ between $dU_{xy\_n}$ for the node and for any neighboring nodes (e.g., other nodes in the given layer within a threshold distance (e.g., within 10 adjacent nodes) of the node) is calculated. For example, if a node has a $dU_{xy\_n}=2$, and neighboring nodes have values of 4, 7, 9, 2, 5, then $dU_{xy\_n\_mx}=abs(2-max(4, 7, 9, 2, 5))=7$. In certain embodiments, the $dU_{xy\_n\_mx}$ values may be normalized (e.g., scaled to a range from 0-1).

At 512, for the given layer, for each node it is determined if $dU_{xy\_n\_mx}$ satisfies (e.g., is below) a threshold value. If the $dU_{xy\_n\_mx}$ does not satisfy (e.g., is above) the threshold value, it is determined that there is a potential build error at the node, such as due to a deformation that may cause a rupture or stress-line. If the $dU_{xy\_n\_mx}$ does satisfy (e.g., is below) the threshold value, it is determined that there is no potential build error at the node, such as due to a deformation that may cause a rupture or stress-line. In particular, the $dU_{xy\_n\_mx}$ value may indicate the difference in amount of displacement in the xy direction of the node as compared to neighboring nodes. If a node is displaced much more than its neighboring nodes, this may be indicative of a potential error.

In certain aspects, displacement may be measured in a plurality of nodes. If all or a statistically significant number of the nodes satisfy the threshold value, this may be indicative that there will not be a build error. Conversely, if all or a statistically significant number of nodes do not satisfy the threshold value, it is determined that there is a potential build error.

As shown in FIGS. 5, 506 and 508 may be performed in parallel with 510 and 512. It should be noted, however, that in other embodiments, such operations may be performed serially.

At 514 it is determined if all the layers have been tested for errors. If all the layers have not been tested, the process 500 returns to 504. Otherwise the process ends.

In certain aspects, instead of or in addition to $dU_{z\_n\_mx}$ and/or $dU_{xy\_n\_mx}$ being compared to thresholds as discussed, $dU_{z\_n}$ and/or $dU_{xy\_n}$ may be compared to threshold values. For example, if $dU_{z\_n}$ satisfies (e.g., is below) a threshold value, then there may not be a potential build error, but if $dU_{z\_n}$ does not satisfy (e.g., is above) the threshold value, then there may be a potential build error. Further, if $dU_{xy\_n}$ satisfies (e.g., is below) a threshold value, then there may not be a potential build error, but if $dU_{xy\_n}$ does not satisfy (e.g., is above) the threshold value, then there may be a potential build error. In particular, if the general displacement of a node, regardless of displacement of its neighbors, is high, there may be a build error.

Trends in displacement values may indicate risk of build error. For example, differences in displacement between nodes may be generally low (e.g., below a threshold value, or relatively constant as compared with other nodes) initially, but may increase over time due to the build of subsequent layers, for example, to reach a value above the threshold value). These differences may indicate a build error, or increased likelihood that a build error will occur.

Geometric features in an object may be susceptible to displacement errors. In some aspects, geometric features in an object may be identified as susceptible to causing build errors. The geometric features may be identified before the simulations, for example, and the simulations may be performed only on the geometric features or may be performed with extra focus on the geometric features as compared to portions of the object deemed less problematic. Alternatively, geometric features may be identified as susceptible to build errors after a simulation has been performed and displacement has been determined. Exemplary geometric features that may be susceptible to displacement errors comprise elongated portions of the object that are have a greater build area in the z-direction than in the xy-direction, two portions of a part that are unconnected in some regions (also called islands) but merge together to form a conjoined part, a beam connecting to a wall, or overhang regions in the object.

The information about potential build errors determined at 508 and/or 512 may be output to a user of a computing device in a display. For example, if the node satisfies a threshold, the node may be displayed with one color or value, while if the node does not satisfy a threshold, the node may be displayed with another color or value. In certain embodiments, the actual values computed for $dU_{xy\_n\_mx}$ and/or $dU_{z\_n\_mx}$ may be displayed, or displayed as a color corresponding to the value. Accordingly, a user can determine where potential build errors may occur in an object.

In some embodiments, if a potential build error is indicated at one or more nodes based on process 500, the design of the object is adjusted (e.g., manually or automatically). For example, computing device 100 may attempt to rotate the object, change a size or shape of the object at areas of potential build error, add a support in areas of potential build error, etc. The computing device 100 may then perform process 500 again. The computing device 100 may iteratively adjust the design of the object and perform process 500 until the simulation indicates there is no build error. The computing device 100 may then direct build of the final design of the object using additive manufacturing.

Figure 6A:
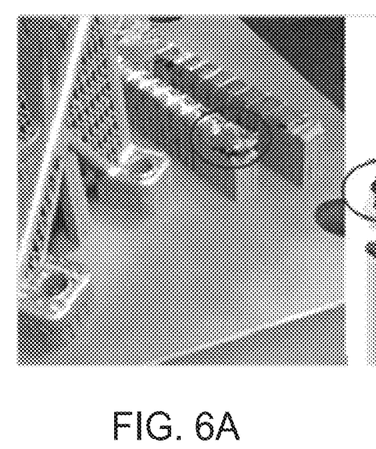
FIG. 6A illustrates an example of an actual deformation that may impact or impede movement of a recoater on an actual object.
Figure 6B:
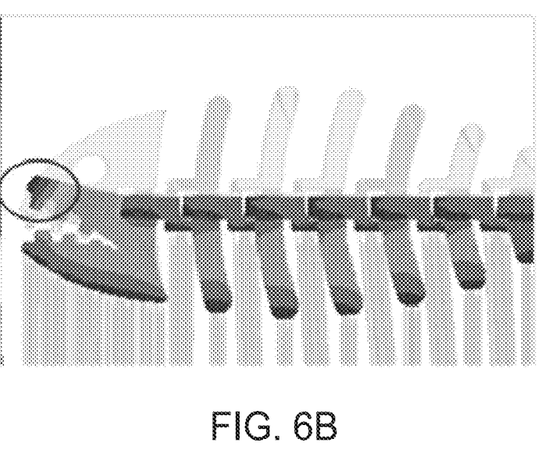
FIG. 6B illustrates an example of a simulation indicating a potential deformation that may impact or impede movement of a recoater.

For example, FIG. 6A illustrates, in the circled area, what an actual deformation that may impact or impede movement of a recoater may look like on an actual object. Further, FIG. 6B illustrates, in the circled area, what may be displayed at nodes where a simulation indicates a potential deformation that may impact or impede movement of a recoater.

Figure 7A:
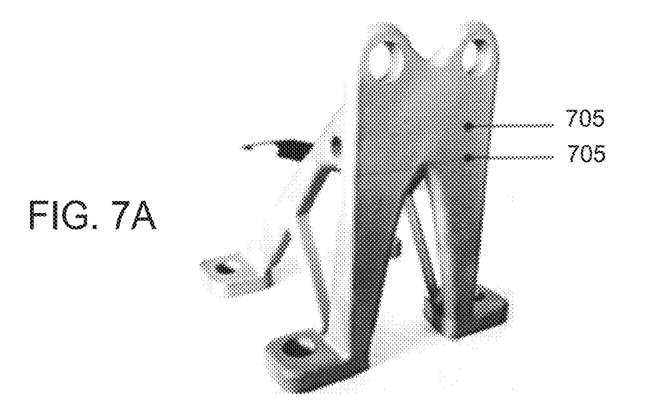
FIG. 7A illustrates an example of an actual stress-line on an actual object.
Figure 7B:
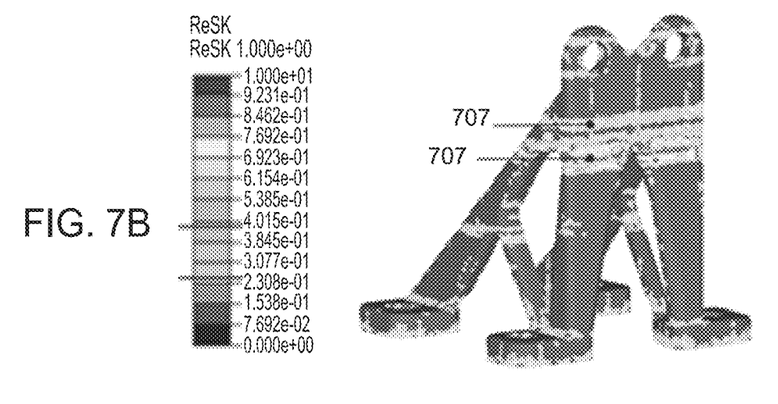
FIG. 7B illustrates an example of a simulation indicating a potential stress-line.

For example, FIG. 7A illustrates, in the area pointed to by arrows 705, what actual stress-lines may look like on an actual object. Further, FIG. 7B illustrates, in the area pointed to by arrows 707, what may be displayed at nodes where a simulation indicates a potential stress-line.

Figure 8A:
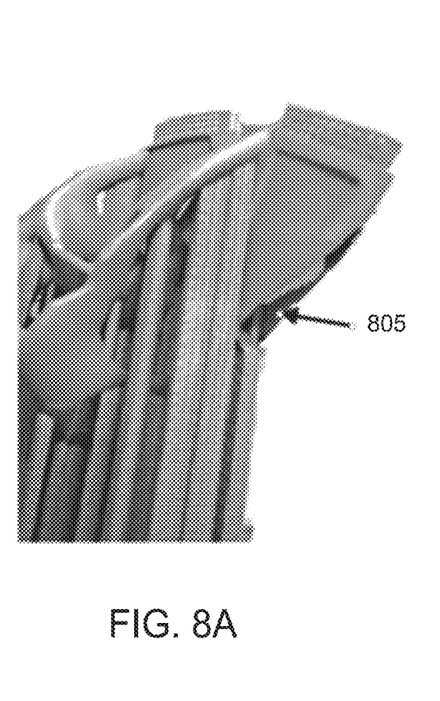
FIG. 8A illustrates an example of an actual rupture on an actual object.
Figure 8B:
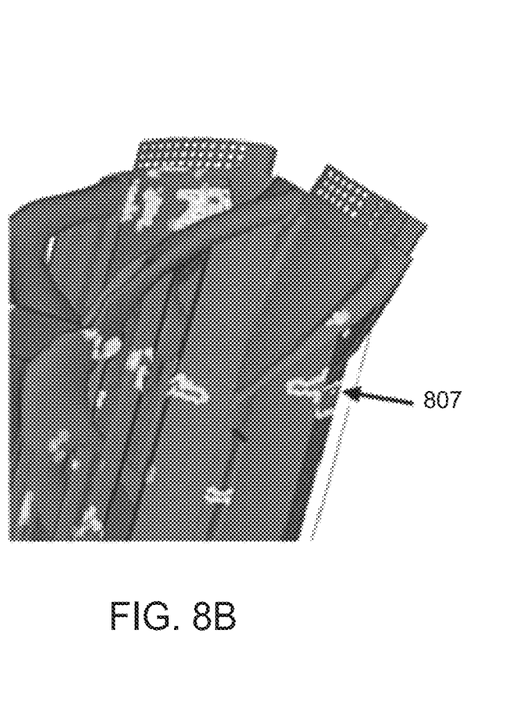
FIG. 8B illustrates an example of a simulation indicating a potential rupture.

For example, FIG. 8A illustrates, in the area pointed to by arrows 805, what an actual rupture may look like on an actual object. Further, FIG. 8B illustrates, in the area pointed to by arrows 807, what may be displayed at nodes where a simulation indicates a potential rupture.

Steps of the methods may be performed iteratively, for example, on objects that have been identified as high risk for build errors such as deformation errors such as recoater collisions or stress-lines, and have been modified. The modified 3D objects may be analyzed for build errors and the results may be displayed as described herein.

Various embodiments disclosed herein provide for the use of a computer control system. A skilled artisan will readily appreciate that these embodiments may be implemented using numerous different types of computing devices, including both general purpose and/or special purpose computing system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

What is claimed is:

1. A computer-implemented method for determining potential build errors in an object to be built using additive manufacturing, the method comprising:

obtaining, in a computing device, a simulated build of a plurality of layers of the object, each of the plurality of layers comprising a plurality of nodes corresponding to different locations in each of the plurality of layers;

for each of one or more nodes of each of one or more of the plurality of layers, determining, by the computing device, one or more displacement vector values corresponding to a difference between a simulated position of the node based on the simulating the build and a designed position of the node based on a design of the object, wherein each of the one or more displacement vector values of the node correspond to a different number of layers having been simulated as built;

for each of one or more nodes of each of one or more of the plurality of layers, determining, by the computing device, a difference between displacement vector values corresponding to adjacent layers;

for each of one or more nodes of each of one or more of the plurality of layers, determining, by the computing device, a maximum absolute difference among the differences between i) the difference between displacement vector values corresponding to adjacent layers of the node, and ii) one or more differences between displacement vector values corresponding to adjacent layers of one or more neighboring nodes to the node;

determining, by the computing device, there is a potential build error when any of the plurality of nodes of the plurality of layers has a maximum absolute difference that does not satisfy a threshold; and determining, by the computing device, there is not a potential build error when each of the plurality of nodes of each the plurality of layers has a maximum absolute difference that does satisfy the threshold.

2. The method of claim 1, wherein the one or more neighboring nodes are within a threshold distance of the node.

3. The method of claim 1, wherein the maximum absolute difference is indicative of difference in a direction perpendicular to a layer of the plurality of layers.

4. The method of claim 1, further comprising displaying, by the computing device, a graphic indicating if there is a potential build error in any of the plurality of nodes.

5. The method of claim 1, further comprising iteratively adjusting, by the computing device, a design of the object and determining if there is a potential build error until there is not potential build error in the design of the object.

6. The method of claim 5, further comprising manufacturing the object using additive manufacturing.

7. The method of claim 1, wherein the one or more displacement vector values indicates displacement in an xy-plane, wherein the xy plane corresponds to a first layer of the object and is parallel to a build platform on which the object will be built.

8. The method of claim 7, wherein the displacement in the xy-plane is indicative of a shrinkline forming between the first layer of the object and at least one additional layer of the object.

9. The method of claim 1, wherein the one or more displacement vector values indicates displacement in a z-direction.

10. The method of claim 9, wherein the displacement in the z-direction is indicative of a build failure.

11. A non-transitory computer readable medium comprising instructions that when executed by a computing device cause the computing device to perform:

obtaining a simulated build of a plurality of layers of the object, each of the plurality of layers comprising a plurality of nodes corresponding to different locations in each of the plurality of layers;

for each of one or more nodes of each of one or more of the plurality of layers, determining one or more displacement vector values corresponding to a difference between a simulated position of the node based on the simulating the build and a designed position of the node based on a design of the object, wherein each of the one or more displacement vector values of the node correspond to a different number of layers having been simulated as built;

for each of one or more nodes of each of one or more of the plurality of layers, determining a difference between displacement vector values corresponding to adjacent layers;

for each of one or more nodes of each of one or more of the plurality of layers, determining a maximum absolute difference among the differences between i) the difference between displacement vector values corresponding to adjacent layers of the node, and ii) one or more differences between displacement vector values corresponding to adjacent layers of one or more neighboring nodes to the node;

determining there is a potential build error when any of the plurality of nodes of the plurality of layers has a maximum absolute difference that does not satisfy a threshold; and determining there is not a potential build error when each of the plurality of nodes of each the plurality of layers has a maximum absolute difference that does satisfy the threshold.

12. A computing device comprising:

a memory; and a processor coupled to the memory, the processor being configured to:

obtain a simulated build of a plurality of layers of the object, each of the plurality of layers comprising a plurality of nodes corresponding to different locations in each of the plurality of layers;

for each of one or more nodes of each of one or more of the plurality of layers, determine one or more displacement vector values corresponding to a difference between a simulated position of the node based on the simulating the build and a designed position of the node based on a design of the object, wherein each of the one or more displacement vector values of the node correspond to a different number of layers having been simulated as built;

for each of one or more nodes of each of one or more of the plurality of layers, determine a difference between displacement vector values corresponding to adjacent layers;

for each of one or more nodes of each of one or more of the plurality of layers, determine a maximum absolute difference among the differences between i) the difference between displacement vector values corresponding to adjacent layers of the node, and ii) one or more differences between displacement vector values corresponding to adjacent layers of one or more neighboring nodes to the node;

determine there is a potential build error when any of the plurality of nodes of the plurality of layers has a maximum absolute difference that does not satisfy a threshold; and determine there is not a potential build error when each of the plurality of nodes of each the plurality of layers has a maximum absolute difference that does satisfy the threshold.

13. The non-transitory computer readable medium of claim 11, wherein the maximum absolute difference is indicative of difference in a direction perpendicular to a layer of the plurality of layers.

14. The non-transitory computer readable medium of claim 11, wherein the instructions when executed by the computing device further cause the computing device to perform displaying a graphic indicating if there is a potential build error in any of the plurality of nodes.

15. The computing device of claim 12, wherein the processor is further configured to iteratively adjust a design of the object and determine if there is a potential build error until there is not a potential build error in the design of the object.

16. The computing device of claim 12, wherein the one or more displacement vector values indicates displacement in an xy-plane, wherein the xy plane corresponds to a first layer of the object and is parallel to a build platform on which the object will be built.

17. The computing device of claim 16, wherein the displacement in the xy-plane is indicative of a shrinkline forming between the first layer of the object and at least one additional layer of the object.

\* \* \* \* \*